(12) United States Patent
Oshima et al.

(10) Patent No.: US 10,961,607 B2
(45) Date of Patent: Mar. 30, 2021

(54) HARDFACING ALLOY AND HARDFACING MEMBER

(71) Applicants: KABUSHIKI KAISHA TOYOTA CHUO KENKYUSHO, Nagakute (JP); TOYOTA JIDOSHA KABUSHIKI KAISHA, Toyota (JP)

(72) Inventors: Tadashi Oshima, Nagakute (JP); Hajime Kato, Nagakute (JP); Kouji Tanaka, Nagakute (JP); Takashi Saito, Nagakute (JP); Natsuki Sugiyama, Nisshin (JP); Minoru Kawasaki, Toyota (JP); Jun Nomasaki, Miyoshi (JP); Hisao Fukuhara, Toyota (JP); Naoyuki Miyara, Nagoya (JP); Hironori Aoyama, Toyota (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 16/156,719

(22) Filed: Oct. 10, 2018

(65) Prior Publication Data
US 2019/0136346 A1     May 9, 2019

(30) Foreign Application Priority Data
Nov. 9, 2017  (JP) ............................ JP2017-216124

(51) Int. Cl.
*C22C 9/06*     (2006.01)
*B22F 7/08*     (2006.01)
(Continued)

(52) U.S. Cl.
CPC .................. *C22C 9/06* (2013.01); *B22F 7/08* (2013.01); *B22F 10/00* (2021.01); *F01L 3/04* (2013.01); *F16K 25/00* (2013.01); *B22F 2301/10* (2013.01)

(58) Field of Classification Search
None
See application file for complete search history.

(56) References Cited

U.S. PATENT DOCUMENTS 5,188,799 A * 2/1993 Mori .................... B23K 35/302
                                                         148/414
5,843,243 A * 12/1998 Kawasaki ................ C22C 9/06
                                                         148/435
(Continued)

FOREIGN PATENT DOCUMENTS

JP      H10-96037 A      4/1998
JP      2002-194462 A    7/2002
(Continued)

OTHER PUBLICATIONS

Aug. 6, 2019 Japanese Office Action issued in Japanese Patent Application No. 2017-216124.

*Primary Examiner* — Daniel J. Schleis
(74) *Attorney, Agent, or Firm* — Oliff PLC (57) ABSTRACT

A hardfacing alloy satisfies the following condition when the hardfacing alloy as a whole is 100 mass % (also simply referred to as "%," hereinafter), Ni: 10-25%, Si: 1-3%, Fe: 3-18%, the total of one or more elements of Mo, W, and Nb: 6.5-20%, and the balance: Cu and impurities. In particular, it preferably satisfies Fe+2Mo≥22.6(%), Mo equivalent/Fe≥1.17, and Mo equivalent=Mo+0.522W+1.033Nb. In a hardfacing part composed of the hardfacing alloy, coarse hard particles are formed to ensure the wear resistance, and a soft phase present in the hard particles ensures the machinability. This may be understood as a raw material powder for (Continued)

hardfacing treatment and may also be understood as a hardfacing member in which a hardfacing part is formed on a base material using the raw material powder.

9 Claims, 4 Drawing Sheets

(51) Int. Cl.
*F01L 3/04* (2006.01)
*F16K 25/00* (2006.01)
*B22F 10/00* (2021.01)

(56) References Cited

U.S. PATENT DOCUMENTS

| | | | |
|---|---|---|---|
| 5,911,949 A | 6/1999 | Ninomiya et al. | |
| 7,850,795 B2 * | 12/2010 | Kawasaki | F01L 3/04 |
| | | | 148/414 |
| 2004/0045641 A1 * | 3/2004 | Kawasaki | C22C 9/00 |
| | | | 148/435 |
| 2007/0125458 A1 | 6/2007 | Kawasaki et al. | |
| 2017/0037495 A1 | 9/2017 | Kawasaki et al. | |

FOREIGN PATENT DOCUMENTS

| | | |
|---|---|---|
| JP | 2006-98085 A | 4/2006 |
| JP | 4114922 B2 | 7/2008 |
| JP | 4472979 B2 | 6/2010 |
| JP | 2017-36470 A | 2/2017 |
| WO | 02/055748 A1 | 7/2002 |

* cited by examiner

FIG.1A

Sample 16

Average composition (at%) of analysis points 7 to 9

| Si | Fe | Ni | Cu | Mo | |
|---|---|---|---|---|---|
| 12.2 | 20.4 | 22.8 | 1.5 | 43.0 | $\mu$ phase |

Average composition (at%) of analysis points 13 to 16

| Si | Fe | Ni | Cu | Mo | |
|---|---|---|---|---|---|
| 16.2 | 18.6 | 29.0 | 3.3 | 32.9 | Laves phase |

Average composition (at%) of analysis points 3 to 6

| Si | Fe | Ni | Cu | Mo | |
|---|---|---|---|---|---|
| 1.1 | 5.6 | 2.9 | 0.5 | 89.9 | Mo rich phase |

FIG.1B

Sample C3

Average composition (at%) of analysis points 1 to 5

| Si | Fe | Ni | Cu | Mo | |
|---|---|---|---|---|---|
| 14.2 | 17.7 | 18.6 | 4.2 | 45.3 | μ phase |

Average composition (at%) of analysis points 6 to 10

| Si | Fe | Ni | Cu | Mo | |
|---|---|---|---|---|---|
| 16.9 | 20.5 | 24.6 | 4.94 | 33.2 | Laves phase |

FIG.4 ical Field

HARDFACING ALLOY AND HARDFACING MEMBER

TECHNICAL FIELD

The present invention relates to a hardfacing alloy and the like with which a hardfacing part excellent in the wear resistance or machinability can be obtained.

BACKGROUND ART

The peripheral part of an intake or exhaust port of a cylinder head of an internal-combustion engine (referred to as an "engine") may be provided with a valve seat composed of an alloy that is more excellent in the wear resistance (particularly in the adhesive wear resistance) than a base material (e.g. an aluminum alloy).

The valve seat is generally formed by press-fitting (hammering) a seat ring composed of an iron-base sintered alloy into a ring groove formed at the outer peripheral part of a port of a cylinder head. On the other hand, it is proposed to form a valve seat by hardfacing treatment using a laser cladding method or the like. Change from the hammering-type valve seat to the hardfacing-type valve seat can increase the degree of freedom in design around the dynamic valve system and improve the cooling performance and the like.

For the hardfacing-type valve seat, a copper alloy excellent in the wear resistance may usually be used, and various copper alloys having different component compositions have been conventionally proposed. Description regarding this is found, for example, in the following patent literature.

PRIOR ART LITERATURE

Patent Literature

[Patent Literature 1] JP10-96037A
[Patent Literature 2] JP2017-36470A
[Patent Literature 3] U.S. Pat. No. 4,114,922

SUMMARY OF INVENTION

Problems to be Solved by the Invention

The copper alloy (copper-base alloy) of Patent Literature 1 to 3 contains rare Co or Cr or C as an essential element. Moreover, nothing in Patent Literature 1, 2 describes the machinability. Patent Literature 3 describes the balance between the wear resistance and the machinability, but the copper-base alloy of Patent Literature 3 is not necessarily sufficient in the wear resistance or machinability.

The present invention has been made under such circumstances and an object of the present invention is to provide a novel hardfacing alloy and the like that comprise a composition different from the conventional copper alloy (copper-base alloy) and can ensure the wear resistance or machinability after hardfacing treatment.

Means for Solving the Problems

As a result of intensive studies to solve the above problems, the present inventors have newly developed a hardfacing alloy comprising a component composition different from conventional ones. Developing this achievement, the present inventors have accomplished the present invention which will be described below.

《Hardfacing Alloy》

(1) The hardfacing alloy of the present invention satisfies the following component composition when the hardfacing alloy as a whole is 100 mass % (also simply referred to as "%," hereinafter).

Ni: 10-25%, Si: 1-3%, Fe: 3-18%,
the total of one or more elements of Mo, W, and Nb: 6.5-20%, the balance: Cu and impurities (2) The hardfacing alloy of the present invention can exhibit excellent wear resistance or machinability after hardfacing treatment. The reason for this can be considered as follows. When reaching a certain temperature, the hardfacing alloy of the present invention comes to a state (referred to as a "liquid-liquid phase separation state") in which two alloy liquid phases are separated, that is, an alloy liquid phase (also referred to as a "Cu-based alloy liquid phase") that contains Cu and an alloy liquid phase (also simply referred to as a "second liquid phase") that contains one or more elements of Mo, W, and Nb (also simply referred to as a "second element") are separated. If the hardfacing alloy in this liquid-liquid phase separation state is strongly stirred and rapidly cooled and solidified, a composite structure can be obtained in which hard particles obtained by solidification of the second liquid phase are dispersed substantially uniformly in a matrix (referred to as a "copper-base matrix") obtained by solidification of the Cu-based alloy liquid phase.

The presence of hard particles reduces the load on the copper-base matrix which is prone to adhesion and sliding wear. Moreover, even under a low oxygen atmosphere, if the hard particles are preferentially oxidized, a high-temperature lubricating action can also be exerted. It can thus be considered that the hardfacing alloy of the present invention exhibits excellent wear resistance not only at room temperatures but also at high temperatures.

In the case of the hardfacing alloy of the present invention, the hard particles can involve a soft phase that reduces the average hardness of the hard particles. When a cutting process is performed after hardfacing treatment, therefore, the cutting resistance is reduced, the lifetime of the cutting tool is increased, and other suitable properties may be obtained. It can thus be considered that the hardfacing alloy of the present invention also exhibits excellent machinability.

The hard particles according to the present invention are composed mainly of an alloy (compound) of the second element, and the hard phase is considered to be a Laves phase, a µ phase, or the like that contains a large amount of Ni, Si and Fe. In contrast, the soft phase is considered to be composed of a phase (second element rich phase) that has a relatively small content of Ni, Si, and Fe and contains a large amount of the second element. This soft phase is considered also as a solid solution phase in which Ni, Si, and Fe are dissolved in the second element rich phase.

《Hardfacing Member》

The present invention can also be perceived as a hardfacing member. That is, the present invention may be understood as a hardfacing member that comprises a base material and a hardfacing part formed on the base material, wherein the hardfacing part comprises the above-described hardfacing alloy.

《Method of Manufacturing Hardfacing Member》

Further, the present invention can also be perceived as a method of manufacturing a hardfacing member. For example, the present invention may be understood as a manufacturing method in which the hardfacing member is obtained by a laser cladding method using a raw material powder that comprises the above-described hardfacing alloy.

«Others»

(1) The "hard" particles according to the present invention are intended to mean particles that are harder than the copper-base matrix, but may be referred to as dispersed particles in other words.

As referred to in the present description, the term "X-base" or "X alloy" is intended to mean that the amount of X element is the largest in the entire composition of interest in terms of the atomic fraction (at %).

The hardfacing alloy of the present invention encompasses both the hardfacing alloy before hardfacing treatment and the hardfacing alloy after hardfacing treatment. For example, the hardfacing alloy may be a raw material (such as powder or wire) to be subjected to hardfacing treatment or may also be a hardfacing part that has a microstructure in which the hard particles are dispersed in the copper-base matrix after hardfacing treatment.

It suffices that the hardfacing alloy can come to a liquid-liquid phase separation state that generates a second liquid phase having a property of repelling the Cu-based alloy liquid phase. The hardfacing alloy is not limited to a monotectic alloy and may also be an alloy that can partially undergo a monotectic reaction while being based on a peritectic alloy.

As referred to in the present description, "%" in relation to the component composition is intended to mean "mass %" unless otherwise stated. It is to be noted that the hardfacing alloy of the present invention can contain a trace amount (1% or less in total, for example) of modifying elements and impurities.

(2) Unless otherwise stated, a numerical range "x-y" as referred to in the present description includes the lower limit x and the upper limit y. Various numerical values or any numerical value included in numerical ranges described in the present description may be selected or extracted as a new lower limit or am upper limit, and any numerical range such as "a-b" may thereby be newly provided using such a new lower limit or an upper limit.

EMBODIMENTS FOR CARRYING OUT THE INVENTION

One or more features freely selected from the present description can be added to the features of the present invention. The content described in the present description can be applied not only to the hardfacing alloy of the present invention but also to a hardfacing member and a method of manufacturing the same. In a certain case, methodological features can be features regarding a product.

«Component Composition»

(1) Overall Composition

The hardfacing alloy of the present invention comprises Cu (the balance) which is a primary element, Ni, Si, Fe, and a second element (one or more of Mo, W, and Nb). Ni and Si, together with Cu, are main elements that constitute a copper-base matrix. Fe, together with Cu, is an important element to come to a liquid-liquid phase separation state when melted and, together with Si (further Ni) and the second element, constitutes hard particles dispersed in the copper-base matrix.

The specific component composition of the hardfacing alloy is adjusted in accordance with the required specs (such as wear resistance, machinability, and structure) of the hardfacing part, but the composition as described below is preferred. Unless otherwise stated, the composition indication (%) described in the present description is a mass fraction relative to the hardfacing alloy (copper-base alloy) as a whole.

Ni is preferably 10-25% in an embodiment, 12-22% in another embodiment, 13-20% in still another embodiment, and 15-18% in a further embodiment. Ni can dissolve in the copper-base matrix to increase its strength. Ni is responsible for the liquid-liquid phase separation and affects coarsening of the hard particles and the wear resistance of the hardfacing alloy. An unduly small amount of Ni may deteriorate the strength of the matrix while an unduly large amount of Ni may deteriorate the tendency of liquid-liquid phase separation to cause fine hard particles and also deteriorate the wear resistance.

Si is preferably 1-3% in an embodiment, 1.5-2.9% in another embodiment, and 2-2.8% in a further embodiment. Si contributes to reinforcement of the copper-base matrix or improvement of the hardfacing properties. Si forms a silicide together with Fe and the second element and contributes to formation of the hard particles. An unduly small amount of Si may deteriorate such effects while an unduly large amount of Si may deteriorate the machinability.

Fe is preferably 3-18% in an embodiment, 5-15% in another embodiment, 6-12% in still another embodiment, and 7-10% in a further embodiment. An unduly small amount of Fe may cause insufficient generation of the hard particles, thus deteriorating the wear resistance. An unduly large amount of Fe may deteriorate the machinability.

The total amount of the second elements (one or more of Mo, W, and Nb) is preferably 6.5-20% in an embodiment, 7-15% in another embodiment, 7.5-12% in still another embodiment, and 8-11% in a further embodiment. The second element forms the hard particles together with Fe and Si. In particular, Mo repels Cu up to a higher temperature as compared with Fe thereby to allow the liquid-liquid phase separation state to be readily generated, and exhibits self-lubricating properties to enhance the wear resistance of the hardfacing part. An unduly small amount of the second element may deteriorate such effects while an unduly large amount of the second element may deteriorate the hardfacing properties.

The hardfacing alloy of the present invention may contain a trace amount of modifying elements to such an extent that they do not affect the above-described component composition. Examples of such modifying elements include C: 0.01-0.5%, Co: 0.1-1%, and Cr: 0.5-2%. Note, however, that the total amount of such modifying elements is preferably 3% or less in an embodiment and 1% or less in another embodiment.

(2) Component Composition and Wear Resistance

The hardfacing alloy exhibits excellent wear resistance as the volume ratio (area ratio when viewed in the sliding contact surface (cross section)) of hard particles formed after hardfacing treatment and the particle diameter of the hard particles increase. The present inventors have found that the volume ratio (area ratio) of the hard particles and the maximum diameter thereof depend largely on an amount (L2) of the second liquid phase generated when melted and have a good correlation.

On the basis of a large number of samples, the present inventors conducted multivariate analysis on the relationship between the component composition of the hardfacing alloy and the second liquid phase amount and have also found that the second liquid phase mole fraction (mol %) correlates strongly with the concentrations (mass %) of Fe and the second element (in particular Mo) and the following relational expression is established.

$$L2 \approx Fe+2Mo-4.65 \qquad \text{(Expression 10)}$$

Furthermore, on the basis of a large number of actually manufactured samples, the inventors conducted an evaluation for the relationship between the area ratio or maximum diameter of the hard particles and the wear resistance of the hardfacing alloy and have found that stable wear resistance can be obtained under L2≥18%. When this is applied to (Expression 10), the following expression is obtained.

$$Fe+2Mo \geq 22.6(\%) \qquad \text{(Expression 11)}$$

The lower limit of the left side is more preferably 23 mass % (also simply referred to as "%") or more in an embodiment, 24% or more in another embodiment, and 25% or more in a further embodiment. The upper limit of the left side is defined by itself from the composition ranges of Fe and the second element, but suffice it to say that the upper limit of the left side is preferably 28% or less in an embodiment and 27% or less in another embodiment.

(3) Component Composition and Machinability

The excellent machinability which the hardfacing alloy of the present invention exhibits can be developed by the soft phase involved in the hard particles. Therefore the hard particles according to the present invention are preferably composed of a mixed phase in which the hard phase and the soft phase are mixed.

The hard phase is preferably a compound phase (Laves phase or μ phase) composed mainly of the second element which contains a large amount of Fe, Ni, and Si. On the other hand, the soft phase is composed of a second element (metal) rich phase in which a relatively small amount of Fe, Ni, and Si is contained in a solid solution form, and the fraction of the rich phase in the hard particles (rich phase ratio) is preferably not less than a predetermined value because sufficient machinability can be ensured in this case.

The present inventors have found that, when the second element is Mo, for example, the rich phase ratio can be indexed by the $Mo_3Si$ ratio based on thermodynamic analysis. In addition, on the basis of a large number of samples, the present inventors conducted multivariate analysis on the component composition of the hardfacing alloy and the $Mo_3Si$ ratio and have found that the $Mo_3Si$ ratio (mol %) also correlates strongly with the concentrations (mass %) of Fe and the second element (Mo is an example) and the following relational expression is satisfied.

$$Mo_3Si \text{ ratio} \approx 34.1Mo/Fe-33.3 \qquad \text{(Expression 20)}$$

Here, at least a part of Mo can be substituted with W or Nb and the above expression can therefore be extended as follows.

$$Mo_3Si \text{ ratio} \approx 34.1Mo \text{ equivalent}/Fe-33.3 \qquad \text{(Expression 30)}$$

$$Mo \text{ equivalent}=Mo+0.522W+1.033Nb \qquad \text{(Expression 31)}$$

Each coefficient for W and Nb is an atomic weight ratio to Mo. That is, 0.522≈Mo atomic weight (95.941)/W atomic weight (183.841) and 1.033≈Mo atomic weight (95.941)/Nb atomic weight (92.906) are satisfied.

Furthermore, on the basis of a large number of actually manufactured samples, the inventors conducted an evaluation for the relationship between the $Mo_3Si$ ratio in the hard particles and the machinability of the hardfacing alloy and have found that the machinability can be stably ensured under $Mo_3Si$ ratio≥7. When this is applied to (Expression 30), the following expression is obtained.

$$Mo \text{ equivalent}/Fe \geq 1.17 \qquad \text{(Expression 21)}$$

The lower limit of the left side is more preferably 1.18 or more in an embodiment, 1.2 or more in another embodiment, and 1.22 or more in a further embodiment. The upper limit of the left side is defined by itself from the composition ranges of Fe and the second element, but suffice it to say that the upper limit of the left side is preferably 2.0 or less in an embodiment and 1.8 or less in another embodiment.

(4) Second Element (Mo, W, Nb)

In the hardfacing alloy of the present invention, Mo, W, and Nb all contribute to formation of the hard particles and exhibit similar functions. Suffice it to say that Mo is more preferred than W or Nb because of its low aggression to others.

In this regard, when the hardfacing alloy of the present invention as a whole is 100%, the hardfacing alloy is preferably composed, for example, of Ni: 12-22% in an embodiment or 14-19% in another embodiment, Si: 1-3% in an embodiment or 2-2.9% in another embodiment, Fe: 5-15% in an embodiment or 6-10% in another embodiment, Mo: 6.5-15% in an embodiment or 7.5-11% in another embodiment, and the balance: Cu and impurities. The component composition in this case preferably satisfies the following expressions.

$$Fe+2Mo \geq 22.6(\%) \qquad \text{(Expression 11)}$$

$$Mo/Fe \geq 1.17 \qquad \text{(Expression 22)}$$

«Microstructure»

(1) The hardfacing alloy of the present invention can take various forms of the microstructure by adjusting the process from melting to solidification. The microstructure is composed of a copper-base matrix and hard particles (in a substantially spherical shape) dispersed in the copper-base matrix. The hard particles are preferably composed of a hard phase (Laves phase, μ phase) and a soft phase (Mo, W, or Nb rich phase) because in this case the wear resistance and the machinability can be ensured after hardfacing treatment.

(2) To ensure the wear resistance of the hardfacing alloy, the area ratio of the hard particles is preferably 3.5% or more in an embodiment, 4% or more in another embodiment, and 5% or more in a further embodiment. Similarly, the maximum diameter of the hard particles is preferably 65 μm or more in an embodiment, 70 μm or more in another embodiment, and 80 μm or more in a further embodiment. Such a microstructure is readily obtained when the concentrations of Fe and the second element (such as Mo) satisfy the above-described (Expression 11) or (Expression 21).

The "area ratio" as used herein refers to a ratio of the total area occupied by the hard particles having a certain size or more with respect to the field of view (2.0 mm×2.8 mm) obtained when observing the outermost surface (such as a used surface, a sliding contact surface, or a sliding surface) of the hardfacing part using an optical microscope. The "hard particles having a certain size or more" as referred to herein are defined as hard particles having a circle equivalent diameter of 10 μm or more, which is obtained by converting the cross-sectional area into a circular area.

The "maximum diameter" refers to a maximum value of the circle equivalent diameter of each hard particle present in the above field of view. Specific measurement, calculation, etc. of the area ratio and maximum diameter are carried out by image processing (software used: LUZEX available from NIRECO CORPORATION) on the microscopic photograph (image) of the above field of view.

An unduly small amount or small size of the hard particles may cause insufficient wear resistance while an unduly large amount or large size of the hard particles may increase the wear of a counterpart material (aggression to a counter material) and/or deteriorate the machinability. In this regard, the area ratio of the hard particles is preferably 15% or less in an embodiment, 10% or less in another embodiment, and 8% or less in a further embodiment. The maximum diameter of the hard particles is preferably 130 μm or less in an embodiment, 110 μm or less in another embodiment, and 100 μm or less in a further embodiment.

(3) To ensure the machinability of the hardfacing alloy, the hardness of the soft phase (Mo, W, or Nb rich phase) of the hard particles is preferably 400-650 Hv in an embodiment and 450-600 Hv in another embodiment. The hardness of the hard phase is preferably 650-1500 Hv in an embodiment and 700-1200 Hv in another embodiment. The hardness of the copper-base matrix is preferably 150-350 Hv in an embodiment and 200-300 Hv in another embodiment.

The area ratio of the soft phase to the hard particles as a whole is preferably 7% or more in an embodiment, 10% or more in another embodiment, and 15% or more in a further embodiment. The "area ratio" as used herein refers to a ratio of the total area occupied by the soft phase having a certain size or more with respect to the field of view (200 μm×280 μm) obtained by SEM observation and is specified as a white part of the BSE image. Such a microstructure is readily obtained when the concentrations of Fe and the second element (such as Mo) satisfy the above (Expression 11) or (Expression 21/Expression 22).

«Base Material/Hardfacing Member»

The counterpart material (base material) to be overlaid with the hardfacing alloy of the present invention may be any of various materials such as an iron-based material (including stainless steel) and a nonferrous material (aluminum-based material, magnesium-based material, titanium-based material, copper-based material, or the like).

The hardfacing alloy of the present invention is composed of a copper alloy and, therefore, even when it is overlaid on a base material of pure Al or an Al alloy, the hardfacing alloy does not excessively react with the base material. It is thus possible to form a robust hardfacing part with few defects (voids, cracks, etc.) even on a base material composed of an aluminum alloy (such as a cast material or an expanded material).

For example, it is preferred to use the hardfacing alloy of the present invention to form a valve seat (hardfacing part) formed on an intake port and/or an exhaust port of a cylinder head of an aluminum alloy (cast/base material) for an internal-combustion engine. The intake-side valve seat and the exhaust-side valve seat may have different composition and/or structure of the hardfacing parts in accordance with the required characteristics. For example, the wear resistance (high-temperature wear resistance) of the exhaust-side valve seat may be further enhanced by increasing the hard particles or making the hard particles large.

«Laser Cladding Method»

The hardfacing method is not limited, but a hardfacing part having a desired microstructure or characteristics can be obtained, for example, by a laser cladding method.

The laser cladding method is a method that includes melting the supplied hardfacing alloy material (raw material) in a predetermined temperature range using a high-density energy heat source such as a laser beam or an electron beam and rapidly cooling and solidifying the melt on the surface of the base material to form a hardfacing part composed of a certain microstructure (rapidly cooled and solidified structure).

It is conceivable to use a wire material or a rod material as the raw material, but it is preferred to use a powder from the viewpoint of forming a desired microstructure uniformly or stably. Such a raw material powder can be obtained, for example, by an atomization method (gas-atomization method). Atomized powder is also a form of the hardfacing alloy of the present invention. In the powder particles, it is not necessary for the microstructure to be in a form in which the hard particles are crystallized in the copper-base matrix.

The particle size of the raw material powder for hardfacing treatment is preferably, for example, 20-300 μm in an embodiment and 63-106 μm in another embodiment.

The raw material powder may be a single powder and may also be a mixed powder obtained by mixing two or more types of powders having different component compositions, particle size distributions, or the like. However, a uniform hardfacing part can be easily formed when using a single powder excellent in the handling ability.

Carbon dioxide laser, YAG laser, or the like can be used as the laser, but it is preferred to use a semiconductor laser excellent in the controllability. To obtain a microstructure in which substantially spherical hard particles are uniformly dispersed in the copper-base matrix, it is preferred that a molten pool in a liquid-liquid phase separation state be rapidly cooled while being strongly stirred. Such strong stirring can be performed, for example, by periodically turning on and off the irradiation of the raw material powder with laser or periodically changing the laser intensity. Specifically, the output of semiconductor laser may be electronically controlled, or an oscillator or the like may be used as described in U.S. Pat. Nos. 4,114,922 and 4,472,979.

Examples

Hardfacing treatment was performed on base materials by a laser cladding method using raw material powders having different component compositions. For each hardfacing part thus obtained, the structure observation, the wear resistance, and the machinability were evaluated. The present invention will be described in more detail on the basis of these specific examples.

«Production of Samples»

(1) Base Material

Hardfacing treatment was performed on base materials composed of an aluminum alloy (JIS AC2B). Specifically, plate materials (100 mm×100 mm×20 mm) for structure observation, circular ring materials (outer diameter φ80 mm×inner diameter φ20 mm×length 50 mm) for evaluation of the wear resistance, and cylindrical materials (outer diameter φ80 mm×inner diameter φ20 mm×length 50 mm) for evaluation of the machinability were prepared.

(2) Raw Material Powder

Gas atomization powders having the component compositions as listed in Table 1 and Table 2 were prepared as raw material powders. The prepared gas atomization powders were classified by sieving. The powders thus adjusted to particle sizes of 20 to 300 μm were used for hardfacing treatment.

(3) Hardfacing Treatment

Hardfacing treatment was performed through forming a powder layer by placing each raw material powder on a part for hardfacing of the base material and irradiating the powder layer with a laser beam. A hardfacing layer (hardfacing thickness: 2.0 mm, hardfacing width: 6.0 mm) thus obtained by melting and solidifying the powder layer was formed on the part for hardfacing of the base material.

Irradiation with the laser beam was performed by relatively moving the laser beam and the base material while oscillating the carbon dioxide laser in the width direction of the powder layer using a beam oscillator. During this operation, the irradiation with the laser beam was performed while blowing a shielding gas (argon gas) from a gas supply pipe to the part for hardfacing. The laser output was 4.5 kW, the spot diameter of the laser beam on the powder layer was 2.0 mm, the relative moving speed of the laser beam with respect to the base material was 15.0 mm/sec, and the flow rate of the shielding gas was 10 liters/min.

In the hardfacing process, the raw material powder is heated to about 1500° C. or higher to come to a liquid-liquid phase separation state and then rapidly cooled and solidified by heat dissipation to the base material or the like to become a hardfacing part. This can be found from the microstructure, which will be described below.

«Structure»

(1) Observation

For each of the samples listed in Table 1, the cross section of the central part of the hardfacing part was treated with wet polishing and observed with an optical microscope, including the base material. Image analysis (LUZEX) on each microscopic image was performed thereby to obtain the area ratio and maximum circle equivalent diameter of the hard particles dispersed in the field of view (2.0 mm×2.8 mm). The results are listed in Table 1 along with other items.

Figure 1A:
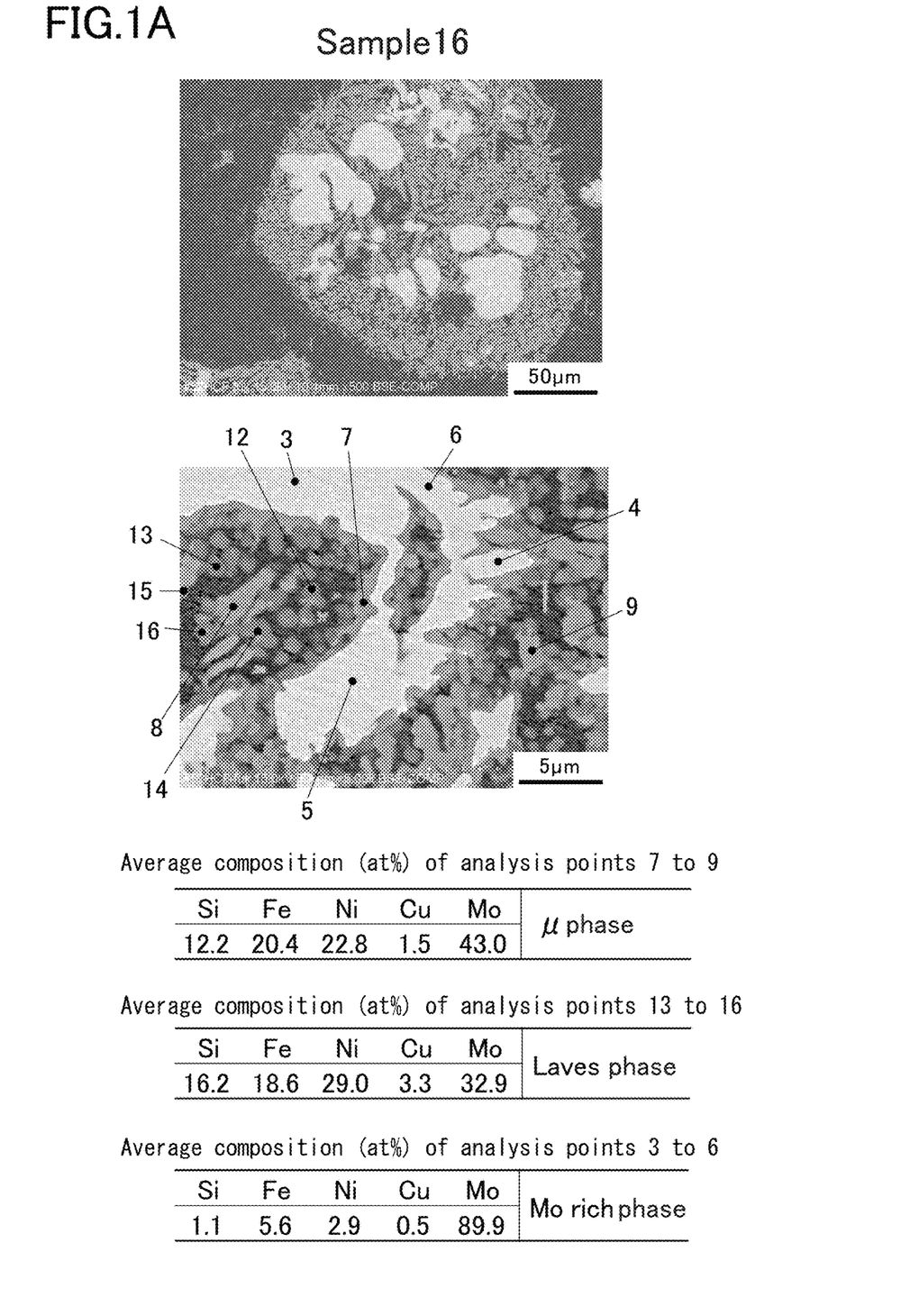
FIG. 1A is a set of BSE images showing a microstructure of the hardfacing part of Sample 16 with tables listing average compositions (at %) of respective parts thereof.
Figure 1B:
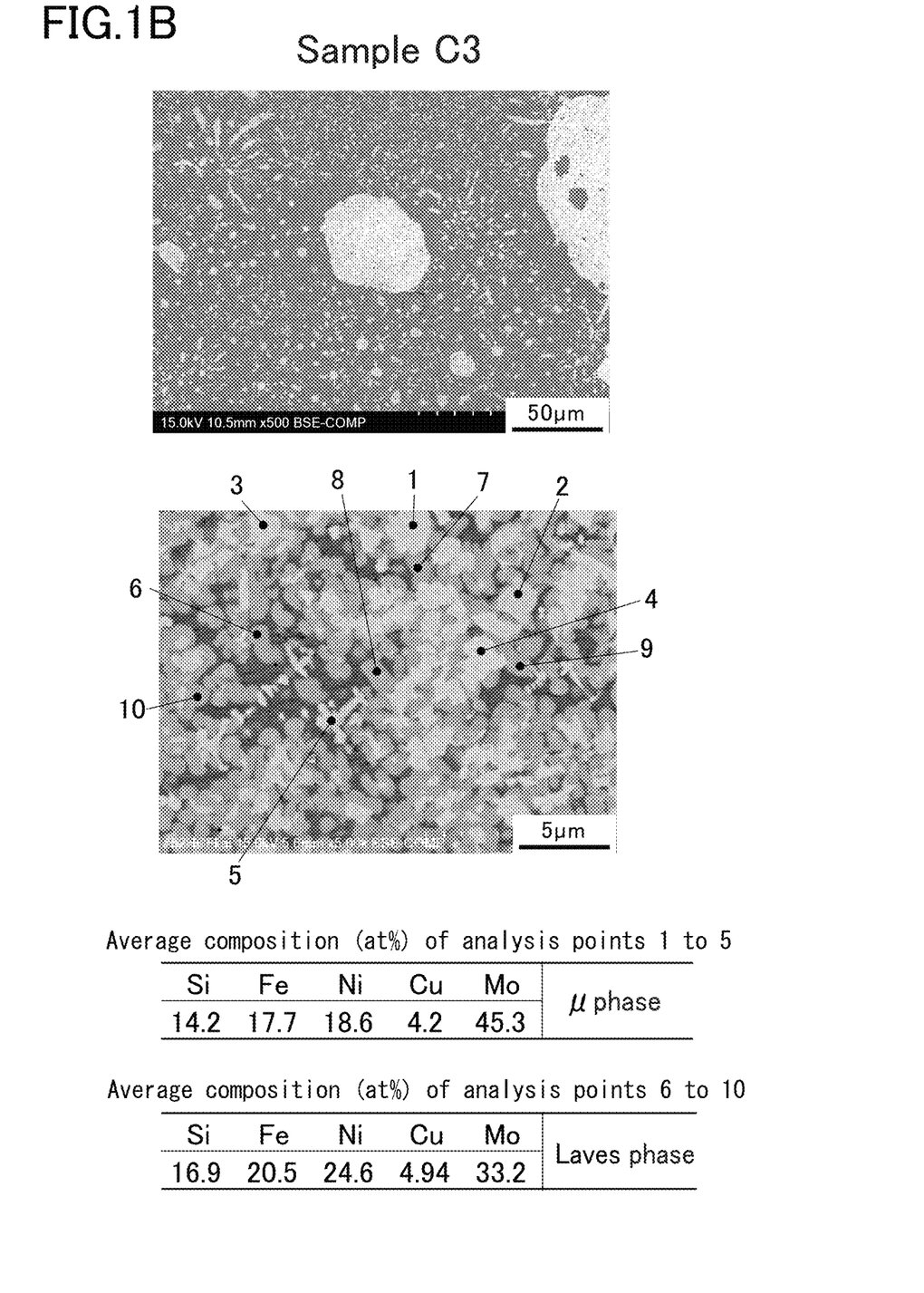
FIG. 1B is a set of BSE images showing a microstructure of the hardfacing part of Sample C3 with tables listing average compositions (at %) of respective parts thereof.

For Sample 16 and Sample C3 listed in Table 2, the cross section of the hardfacing part was observed with a scanning electron microscope (SEM). In addition, the composition of each crystallized substance (hard phase or soft phase) in the hard particles was analyzed with an energy dispersive X-ray spectrometer (EDX) attached to the SEM. The backscattered electron (BSE) images thus obtained and the average compositions (at %) obtained by arithmetically averaging the compositions analyzed for a plurality of points within each crystallized substance are shown in FIG. 1A and FIG. 1B (collectively referred to as "FIG. 1" in a simple term) for respective samples.

(2) Second Liquid Phase Amount (L2)

An alloy obtained by adding Fe and Mo (second element) to a Cu—Ni—Si alloy (Corson alloy) undergoes liquid-liquid phase separation to generate a second liquid drop (second liquid phase) that is rich in solute elements. The hard phase crystallizes and solidifies in the second liquid drop to form coarse hard particles (monotectic reaction).

The second liquid phase amount and the solute element concentration significantly affect the volume ratio and particle diameter of the hard particles dispersed in the copper-base matrix and the kind and ratio of the hard phase contained in the hard particles. Accordingly, for Cu—Ni—Fe—Mo—Si alloys, the second liquid phase amount was calculated for each component composition by thermodynamic analysis using commercially-available software (Thermo-Calc), and the results are listed in Table 1 and Table 2 along with other items. In this calculation, interaction between elements important for the liquid-liquid phase separation was taken into account, such as Cu—Fe—Si and Cu—Mo—Fe. Specifically, a database was used in which the excess energy possessed by a solution with respect to the simple sum of pure substances is stored as a function of temperature/concentration.

As previously above, the second liquid phase mole fraction (mol %) calculated from each component composition by multivariate analysis has a strong correlation with Fe+2Mo (mass %). In Table 1 and Table 2, therefore, Fe+2Mo (mass %) obtained from each component composition is listed along with other items.

(3) $Mo_3Si$ Ratio

The ratio of $Mo_3Si$ (the area ratio of $Mo_3Si$ to the hard particles as a whole, simply referred to as a "$Mo_3Si$ ratio") which can crystallize in the hard particles in addition to the hard phase (mainly Laves phase) was also calculated by the above-described thermodynamic analysis. As previously described, the $Mo_3Si$ ratio calculated from each component composition also has a strong correlation with Mo/Fe (mass ratio) according to multivariate analysis. Therefore Mo/Fe obtained from each component composition is listed in Table 2 along with other items.

«Test»

(1) Wear Resistance Evaluation Test

Figure 4:
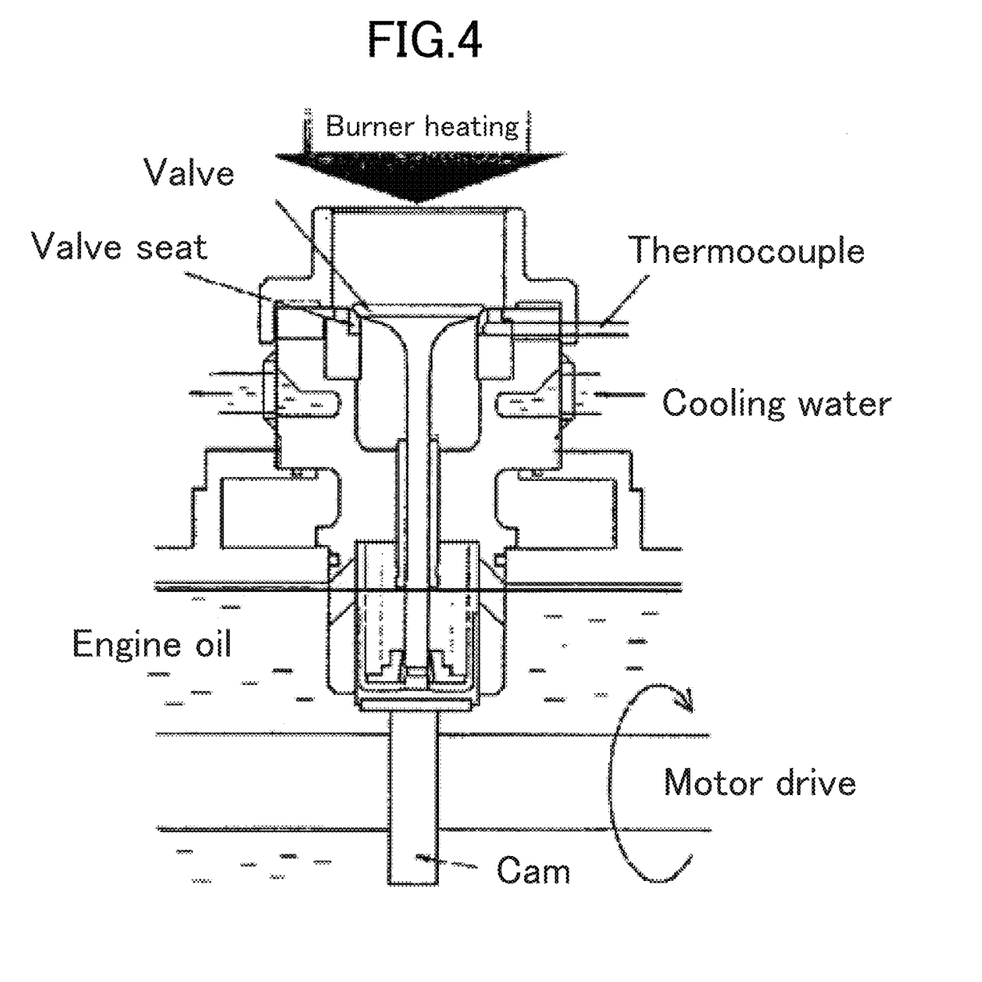
FIG. 4 is a schematic view of a simulation test apparatus.

An actual machine simulation test was conducted using a test apparatus as illustrated in FIG. 4. In this test, a valve composed of heat-resistant steel having a nitrided surface was repeatedly seated on and separated from a simulated valve seat comprising the hardfacing part of each sample. This test was performed while heating the valve side using a burner and water cooling the valve seat side thereby to maintain the temperature (test temperature) in the vicinity of the valve seat at about 300° C. Other test conditions were lift amount: 8.43 mm, motor rotation speed: 3000 rpm, and test time: 8 h.

The amount of axial displacement of the valve measured after this test was employed as the axial wear loss. The axial wear loss obtained for each sample is listed as an evaluation index of the wear resistance in Table 1 along with other items.

(2) Machinability Evaluation Test

The hardfacing part of each sample formed on the end face of the cylindrical base material was subjected to turning with a superhard cutting tool while rotating the base material. Thereafter, the flank wear loss of the cutting tool was measured. The flank wear loss obtained for each sample is listed as an evaluation index of the machinability in Table 2 along with other items.

«Evaluation»

(1) Component Composition

As apparent from Table 1 and Table 2, it can be found that the hardfacing member obtained using the raw material powder (hardfacing alloy) having the component composition defined in the present invention has relatively small axial wear loss and flank wear loss and is excellent in the wear resistance and the machinability.

(2) Microstructure

As apparent from FIG. 1, both the microstructures of Sample 16 and Sample C3 are configured such that coarse hard particles in which fern leaf-like fine hard phases are aggregated are dispersed in the copper-base matrix. Most of the hard particles are estimated to be composed of a compound known as a Laves phase or aμ phase that contains a large amount of Fe, Ni, Mo, and Si.

However, the microstructure of Sample 16 has, in addition to such phases, a white dendrite structure in the particles. As apparent from analysis points 3 to 6 in FIG. 1A, this portion has been found to be a Mo-rich phase having a significantly large amount of Mo, unlike the Laves phase and the µ phase. Although the size, Mo concentration, and hardness of the Mo-rich phase are not necessarily constant depending on the observation point, the local hardness is approximately Hv 550 and the Mo-rich phase is a soft phase softer than the Laves phase and the µ phase.

(3) Second Liquid Phase Amount (L2)

Figure 2:
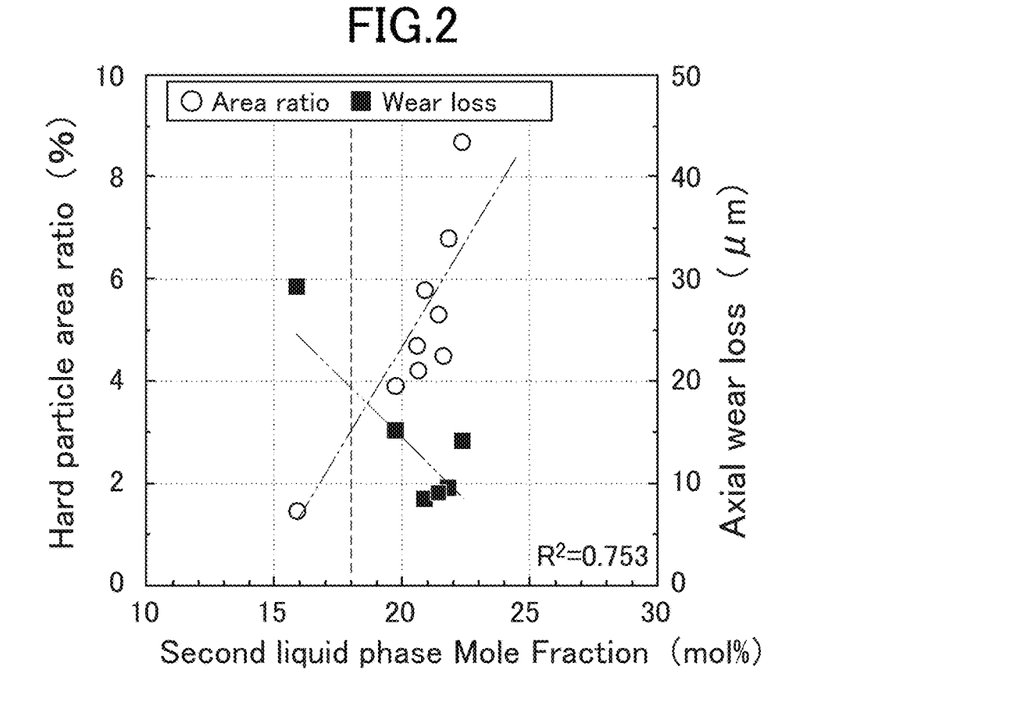
FIG. 2 is a scatter diagram illustrating the relationship between a second liquid phase amount and a hard particle area ratio or an axial wear loss.

As apparent from Table 1, when L2 is 18% or more, the area ratio of the hard particles is 3% or more while the maximum diameter is 60 µm or more, and it can be found that coarse hard particles responsible for the wear resistance are sufficiently present. As a result, it can also be found that when L2 is 18% or more (in other words, Fe+2Mo is 22.6% or more), the axial wear loss is 20 µm or less or 16 µm or less. This is also apparent from FIG. 2 which collectively illustrates the relationship between L2 and the hard particle area ratio or the axial wear loss.

(4) $Mo_3Si$ ratio

Figure 3:
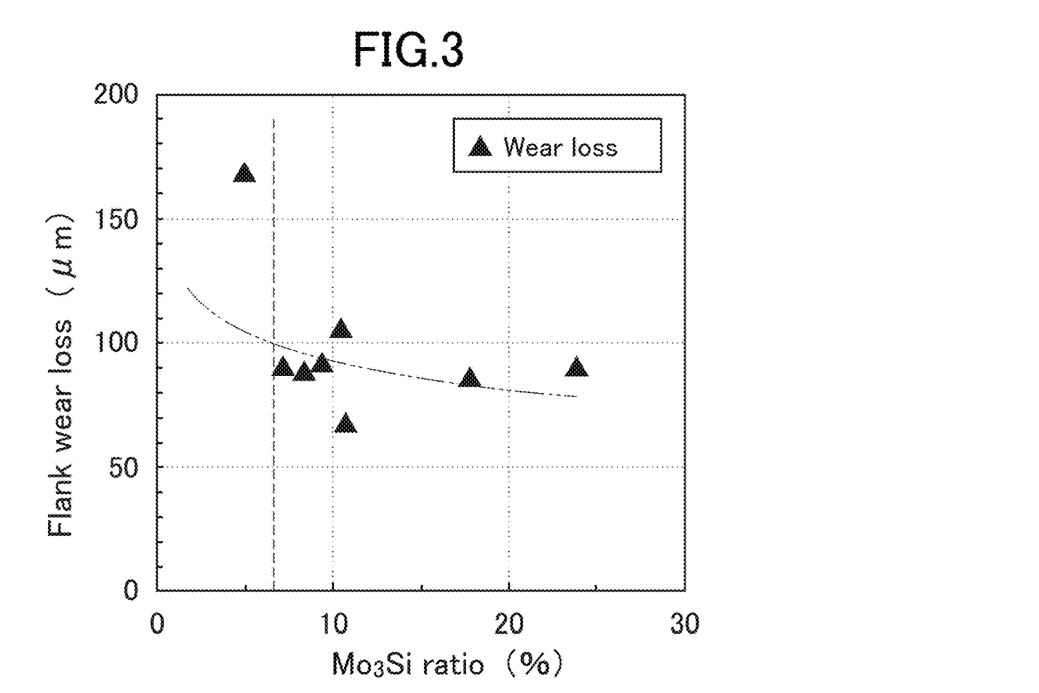
FIG. 3 is a scatter diagram illustrating the relationship between a $Mo_3Si$ ratio and a flank wear loss.

As apparent from Table 2, when the $Mo_3Si$ ratio is 7 or more (in other words, when Mo/Fe is 1.17% or more), the flank wear loss indicative of the machinability are all 110 µm or less. This is also apparent from FIG. 3 which illustrates the relationship between the $Mo_3Si$ ratio and the flank wear loss. The $Mo_3Si$ ratio correlates with the Mo-rich soft phase contained in the hard particles, and it can be said that the machinability is ensured by containing a certain amount or more of the Mo-rich phase in the hard particles.

TABLE 1

| Sample No. | Component composition of raw material powder (mass %/the balance: Cu) | | | | | Indices | | | Characteristics |
|---|---|---|---|---|---|---|---|---|---|
| | Ni | Si | Fe | Mo | Fe + 2Mo | Second liquid phase amount (L2) (mol %) | Area ratio (%) | Maximum diameter (µm) | Axial wear loss (µm) |
| 1 | 19.5 | 2.83 | 9.27 | 8.85 | 26.97 | 24.47 | 3.6 | 74 | — |
| 2 | 16.5 | 2.86 | 7.34 | 9.34 | 26.02 | 22.35 | 8.7 | 96 | 14.2 |
| 3 | 16.3 | 2.45 | 7.29 | 9.09 | 25.47 | 21.79 | 6.8 | 102 | 9.5 |
| 4 | 16.5 | 2.6 | 7.22 | 9.05 | 25.32 | 21.6 | 4.5 | 108 | — |
| 5 | 15.9 | 2.21 | 7.18 | 9.07 | 25.32 | 21.43 | 5.3 | 91 | 9.1 |
| 6 | 17.3 | 2.99 | 8.33 | 8.19 | 24.71 | 20.89 | 5.8 | 87 | 8.5 |
| 7 | 18.4 | 3.06 | 8.55 | 8 | 24.55 | 20.53 | 4.7 | 74 | — |
| 8 | 17.3 | 2.78 | 8.35 | 8 | 24.35 | 20.61 | 4.2 | 77 | — |
| 9 | 16.3 | 2.53 | 7.32 | 8.22 | 23.76 | 19.73 | 3.9 | 69 | 15.1 |
| C1 | 18.2 | 2.92 | 9.6 | 6.02 | 21.64 | 15.88 | 1.5 | 37 | 29.3 |

TABLE 2

| Sample No. | Component composition of raw material powder (mass %/the balance: Cu) | | | | | Indices | | $Mo_3Si$ ratio (%) | Characteristics |
|---|---|---|---|---|---|---|---|---|---|
| | Ni | Si | Fe | Mo | Fe + 2Mo | Second liquid phase amount (L2) (mol %) | Mo/Fe | | Flank wear loss (µm) |
| 11 | 15.9 | 2.95 | 5.13 | 9.1 | 23.33 | 18.5 | 1.774 | 23.7 | — |
| 12 | 16.1 | 1.99 | 5.29 | 8.95 | 23.19 | 18.5 | 1.692 | 26.4 | — |
| 13 | 15.6 | 2.12 | 6.2 | 10.2 | 26.6 | 22.2 | 1.645 | 23.8 | 89 |
| 14 | 15.6 | 2.09 | 6.61 | 9.59 | 25.79 | 21.5 | 1.451 | 17.8 | 85 |
| 15 | 16.3 | 2.65 | 7.74 | 10 | 27.74 | 24.5 | 1.292 | 10.5 | 105 |
| 16 | 15.9 | 2.21 | 7.18 | 9.07 | 25.32 | 21.4 | 1.263 | 10.8 | 67 |
| 17 | 16 | 2.49 | 7.99 | 10 | 27.99 | 24.9 | 1.254 | 9.47 | 90 |
| 18 | 16.4 | 2.47 | 7.26 | 8.85 | 24.96 | 21.2 | 1.219 | 8.34 | 88 |
| 19 | 16.4 | 2.48 | 7.49 | 8.91 | 25.31 | 21.7 | 1.19 | 7.14 | 90 |
| C2 | 17.2 | 3.07 | 8.56 | 9.99 | 28.54 | 25.9 | 1.167 | 4.93 | 168 |
| C3 | 17.6 | 3.16 | 8.36 | 8.9 | 26.16 | 21.1 | 1.065 | 0 | — |

The invention claimed is:

1. A hardfacing alloy satisfying a component composition as below when the hardfacing alloy as a whole is 100 mass % (also simply referred to as "%," hereinafter), the component composition consisting of:
   10-25% of Ni;
   1-3% of Si;
   3-18% of Fe;
   6.5-20% of a total of one or more elements of Mo, W, and Nb;
   1% or less of a total of one or more elements of C, Co, and Cr; and
   a balance of Cu and impurities,
   wherein the component composition satisfies expressions as below:

Mo equivalent/Fe≥1.17         (Expression 21); and

Mo equivalent=Mo+0.522W+1.033Nb         (Expression 31).

2. The hardfacing alloy as recited in claim 1, wherein the component composition satisfies an expression as below:

Fe+2Mo≥22.6(%)         (Expression 11);

3. A hardfacing alloy satisfying a component composition as below when the hardfacing alloy as a whole is 100%, the component composition consisting of:
12-22% of Ni;
1-3% of Si;
5-15% of Fe;
6.5-15% of Mo;
1% or less of a total of one or more elements of C, Co, and Cr; and
a balance of Cu and impurities,
wherein the component composition satisfies an expression as below:

$$Mo/Fe \geq 1.17 \tag{Expression 22}$$

4. The hardfacing alloy as recited in claim 3, wherein the component composition satisfies an expression as below:

$$Fe+2Mo \geq 22.6(\%) \tag{Expression 11}$$

5. The hardfacing alloy as recited in claim 1, wherein the hardfacing alloy is a raw material powder used for hardfacing treatment.

6. A hardfacing member comprising:
a base material; and
a hardfacing part formed on the base material,
the hardfacing part comprising the hardfacing alloy as recited in claim 1.

7. The hardfacing member as recited in claim 6, wherein the hardfacing part comprises a microstructure in which hard particles are dispersed in a copper-base matrix, wherein the hard particles contain one or more elements of Mo, W, and Nb.

8. The hardfacing member as recited in claim 6, wherein the base material comprises an aluminum alloy.

9. The hardfacing member as recited in claim 6, wherein the hardfacing part is a valve seat formed on an intake port and/or an exhaust port of a cylinder head for an internal-combustion engine.

* * * * *

UNITED STATES PATENT AND TRADEMARK OFFICE
CERTIFICATE OF CORRECTION

PATENT NO.         : 10,961,607 B2
APPLICATION NO.    : 16/156719
DATED              : March 30, 2021
INVENTOR(S)        : Tadashi Oshima et al.

Page 1 of 1

It is certified that error appears in the above-identified patent and that said Letters Patent is hereby corrected as shown below:

In the Claims

In Claim 2 (Column 12, Line 65), change:
"(Expression 11);"
To:
--(Expression 11).--

In Claim 4 (Column 13, Line 15), change:
"(Expression 11)"
To:
--(Expression 11).--

Signed and Sealed this
First Day of June, 2021

Drew Hirshfeld
*Performing the Functions and Duties of the*
*Under Secretary of Commerce for Intellectual Property and*
*Director of the United States Patent and Trademark Office*